United States Patent Office 3,548,305
Patented Dec. 15, 1970

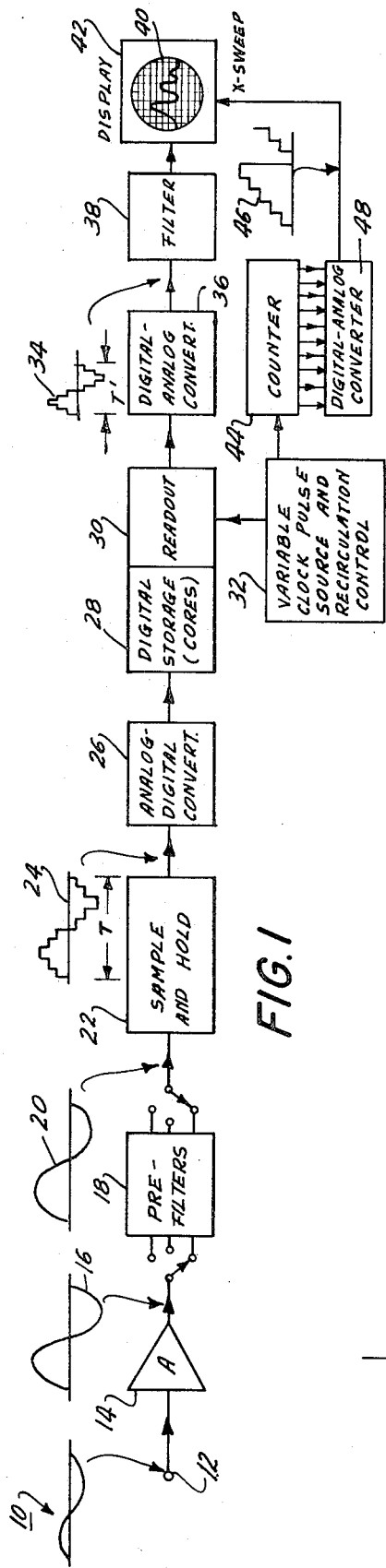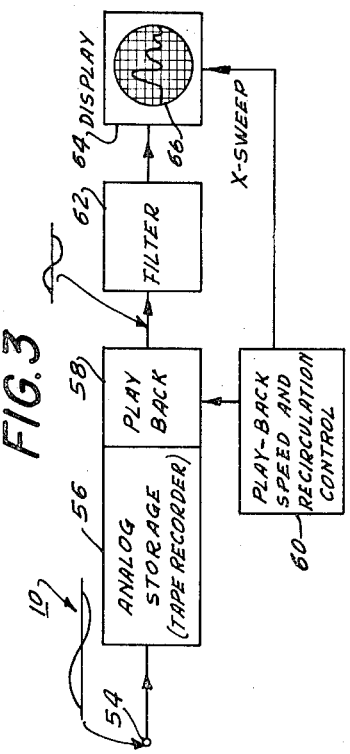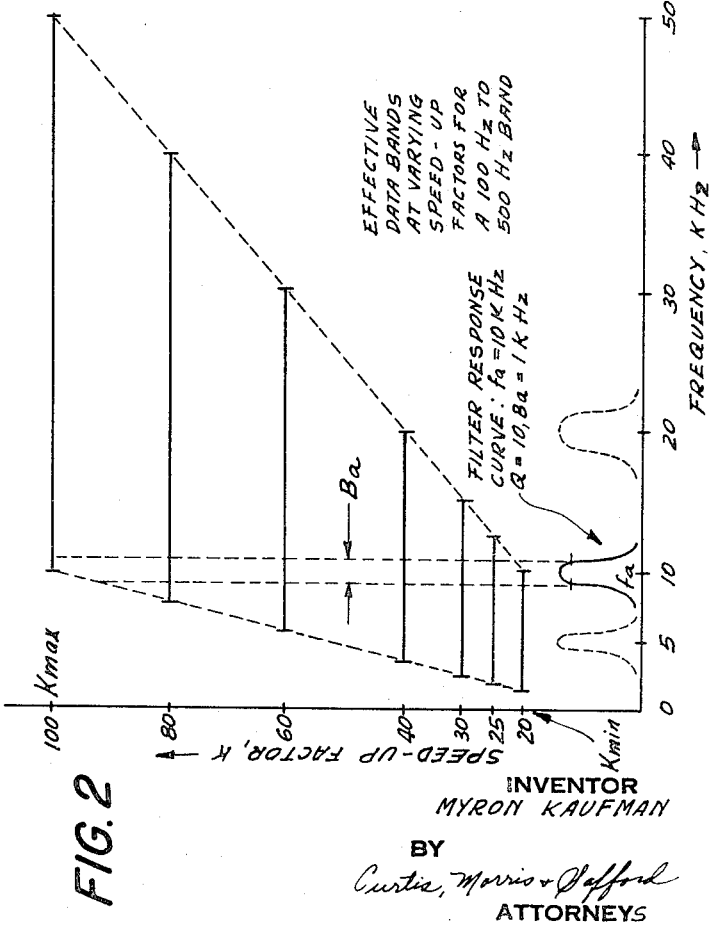

3,548,305
REPETITIVE, VARIABLE READ-OUT SPEED SPECTRUM ANALYSIS APPARATUS AND METHOD
Myron Kaufman, Massapequa, N.Y., assignor to Signal Analysis Industries Corporation, Copiaque, N.Y., a corporation of New York
Filed Jan. 12, 1967, Ser. No. 608,797
Int. Cl. G01r 23/16
U.S. Cl. 324—77    15 Claims

ABSTRACT OF THE DISCLOSURE

Speed-up spectrum analyzer and method in which the speeded-up wave is filtered a number of times by a single fixed-frequency filter, with the speed-up rate being different during each filtering step. The output of the filter indicates the magnitudes of the spectral components of the wave being analyzed.

---

This invention relates to apparatus and methods for "speed-up" spectrum analysis; that is, to the analysis of wave spectra by reproducing the signal being analyzed at a rate substantially faster than that at which the signal was propagated, thus "speeding-up" the signal, and then analyzing the speeded-up wave to perform a Fourier or other analysis on the wave.

One system which has been used in the past to provide "speed-up" of a wave is the so-called "Deltic" (an abbreviation for "Delay Line Time Compressor), which is described, for example, in U.S. Pats. 2,958,039 to V. C. Anderson, and 3,274,341 to W. D. Allen. In such a system, samples of the wave are taken at spaced time intervals and are converted into digital form. The digital-form samples are stored and recirculated in a delay line or lines and there are compressed together to form a signal which has a much smaller time period than the wave being sampled, but still carries essentially the same information as the original wave. The output from this recirculating delay line system is called the "speeded-up" wave. This speeded-up wave then is analyzed by appropriate equipment to give the desired analysis of the wave.

In one prior art system using the speed-up system in performing Fourier analysis of a desired spectrum of the wave, the speeded-up wave is passed through a heterodyne device and then through a filter, the heterodyne device effectively sweeping the filter over the spectrum desired and thus analyzing the wave over the entire desired spectrum. Such a system is shown, for example, in Bulletin 1016 of General Applied Science Laboratories, Inc., Westbury, N.Y., entitled "Low Frequency Analysis," by Kaufman and Schaten, 1964.

Other systems have been proposed in the past for analysis of wave spectra. However, such systems have suffered from the need for expensive and complicated equipment. Such prior systems suffer especially due to the frequent requirement of large numbers of different filters for operation on different parts of the spectra, as well as associated switching equipment to deliver the signal to be analyzed sequentially to different ones of the filters. The above deficiencies are especially burdensome in systems in which it is desired that filtering be carried on at a constant Q for the filters. The many filters required are costly and bulky, and quite inflexible.

Accordingly, it is an object of the present invention to provide a simplified, operationally flexible, fast-operating, compact and less expensive apparatus and method for spectrum analysis. Another object of the invention is to provide such a system and method in which the filter arrangement has a constant Q factor and yet is relatively compact and of relatively low cost.

The drawings and description that follow describe the invention and indicate some of the ways in which it can be used. In addition, some of the advantages provided by the invention will be pointed out.

In the drawings:

FIG. 1 is a schematic diagram of one embodiment of the spectrum analyzer of the present invention;

FIG. 2 is a graph depicting typical operational characteristics of the apparatus and method of the present invention;

FIG. 3 is a schematic diagram of another embodiment of the invention;

Figure 4:
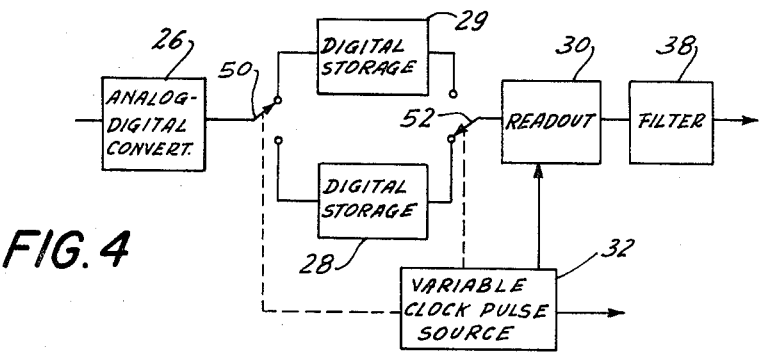
FIG. 4 is a schematic diagram of a portion of another embodiment of the invention.

In the system shown in FIG. 1, the wave 10 to be analyzed is applied to the input terminal 12 of the system. The signal 10 can come from any type of electrical equipment requiring analysis of its signals, such as radar or other communication systems. The system is well adapted to analyze virtually any type of signal, and especially signals having relatively low frequencies down to .005 cycle per second. The signal 10 is depicted in FIG. 1 as a single cycle of a sine wave merely for the purpose of simplification of the drawings. Virtually any regular or irregular wave shape can be analyzed by the system.

The signal applied to input terminal 12 is amplified by means of an amplifier 14 to provide an amplified signal 16. The amplified signal then is fed through one of a series of pre-filters 18 which passes only the spectrum desired to be analyzed. The signal 20 from the pre-filter 18 is sent to a sample and hold circuit 22, of conventional design, which samples the wave 20 at predetermined time intervals and holds its output signal at the level sampled until the next sample is taken. The output signal 24 produced by the sample and hold circuit 22 is of stepped form, as is indicated in FIG. 1.

The signal 24 is sent to an analog-to-digital converter 26 of conventional design which converts each held sample in turn into digital form. The digital signals from converter 26 then are sent to a digital storage device 28 which stores the signals. Digital storage device 28 can be of any well-known type such as a magnetic core array, a magnetic drum, magnetic disks, or magnetic tape recorder. A read-out device 30 forms a part of the digital storage device 28. The read-out device 30 reads-out, in chronological order, the digital information stored in storage 28 upon its receipt of timed clock pulses from a variable clock source device 32. The signal is read-out of unit 30 and into a digital-to-analog converter 36, of conventional design, which converts the signal it receives into an analog signal 34.

The signal 34 is speeded-up; that is, its period T′ is smaller than the period T of the wave 24. In FIG. 1, the period T′ is shown as being about one-half of the period T. However, in practice the ratio of T to T′ (called the "speed-up factor") usually is much greater than the 2 to 1 ratio illustrated in FIG. 1. For example, speed-up ratios of 4,000 to 1 and higher are not at all uncommon. However, a ratio of 2 to 1 is illustrated in FIG. 1 for the sake of clarity in the drawings.

The speeded-up signal 34 next is sent to a filter 38 which passes only a selected band of frequencies of the speeded-up wave 34 and produces a panoramic display 40 of the Fourier series for the wave in a display device 42 such as an oscilloscope.

The clock pulses delivered by source 32 to the read-out device 30 also are delivered to a counter 44 which counts the pulses and converts them into an analog stepped saw tooth signal 46 by means of a digital-to-analog converter 48. The signal 46 is then applied to the horizontal sweep circuit of the display device 42 while the signal from filter 38 is applied to the vertical sweep circuit, thus forming the panoramic display 40 as shown.

In accordance with the present invention, filter 38 preferably is a single conventional electrical filter with a fixed center-frequency and bandwidth. Normally, such a filter would analyze only the components within a selected portion of the spectrum being analyzed. Thus, it would not be possible to analyze the entire spectrum without the addition of other complicated equipment such as heterodyne equipment or the like. Alternatively, in order to analyze the entire spectrum, normal practice would be to provide a number of additional filters each having a different center-frequency, and by means of a switching circuit, apply the signal 34 successively to each of the filters. However, the filters and associated equipment necessary for doing this is complicated, bulky and expensive.

Further in accordance with the present invention, the need for multiple filters or other complicated equipment is avoided by using a single filter 38 of fixed center frequency and passing the signal 34 through the filter a number of times in succession, each at a different speed-up rate. This provides analysis over the entire spectrum by making use of the phenomenon that the speed-up of the wave effectively multiplies the frequency of all of the components of the spectrum by the speed-up factor. Thus, the whole spectrum shifts upwardly or downwardly in frequency as the speed-up factor is shifted. Simply by using a single filter with a center-frequency within the shifted sped-up spectra, and by shifting the spectrum so that its maximum and minimum frequencies at one time or another are covered by the passband of the filter, analysis of the entire spectrum can be obtained without the necessity of extra complex equipment or filters.

The way in which speed-up and the foregoing spectrum shifting is carried out is as follows. When the signal has been stored in digital storage unit 28, a series of clock pulses is sent from the source 32 to the read-out device 30. The read-out device sequentially reads-out the stored signals at a rate determined by the spacing between the clock pulses, i.e., by the clock pulse frequency. Thus, the clock pulse frequency determines the speed-up factor. When the signal has been read-out and passed through the filter 38, the clock-pulse frequency of source 32 is changed, and the signal is again read-out, but at the new speed-up rate. The wave spectrum has been shifted in proportion to the change in the speed-up factor. The clock-pulse frequency can be changed either by hand manipulation of the controls of the clock pulse source, or by a program such as might be stored on magnetic or punched tape or fixed, wired program. This procedure is repeated for as many number of steps as are required to analyze the entire spectrum of interest.

A specific example now will be explained in detail, in connection with FIG. 2, in order to give a more detailed explanation of the method and apparatus of the invention. Suppose that it is desired to analyze a signal over a data band of from 100 to 500 hertz (Hz.). Also, suppose that it is dedsired to perform this analysis with a filter system having a constant Q (Q being the ratio of the center-frequency to the bandwidth of the filter). Assume that the required filter Q is 10, and the desired filter center frequency, $f_a$ is 10 kHz. Thus, the bandwidth $B_a$ of the filter will be 1 kHz. The response curve for this filter is shown at the bottom of FIG. 2.

FIG. 2 shows a graph of the speeded-up data bands in which frequency is plotted against the speed-up factor K for this particular example. It is desired to select the speed-up range so that the entire spectrum is moved past the filter center frequency $f_a$. From the graph it can be seen that the highest frequency of the data band with $K_{min}$ is equal to the filter center-frequency $f_a$ and the lowest frequency of the data band with $K_{max}$ equal $f_a$ at the highest speed-up factor. Thus:

[1] $\qquad K_{max}=f_a/f_o$

[2] $\qquad K_{min}=f_a/f_t$ where $K_{max}$ and $K_{min}$ are, respectively, the maximum and minimum speed-up factors, and $f_o$ and $f_t$ are, respectively, the minimum and maximum frequencies of the original data band before speed-up.

Using the foregoing equations on the data band of 100 to 500 Hz., the minimum speed-up factor $K_{min}$ is 20 and the maximum speed-up factor $K_{max}$ is 100. The minimum frequency in the data band with a speed-up factor of 20 is 20 times 100 or 2 kHz. This data band is illustrated near the bottom of FIG. 2. The data band with a speed-up factor of 100 is illustrated at the top of FIG. 2. By passing the speeded-up signal through the filter a number of times at different speed-up factors, the entire data band will have been analyzed with the use of only one filter.

It can be shown that the necessary number of passes through the filter 38 can be determined by means of the following equation:

[3] $\qquad N=(\frac{1}{2}+Qa) \ln f_t/f_o$ where:

N is the required number of passes through the filter to cover the spectrum;

$Q_a$ equals $fa/Ba$, the ratio of the filter center-frequency to the filter bandwidth;

$f_t$ is the maximum frequency in the spectrum; and $f_o$ is the minimum frequency in the spectrum.

The number of passes N for the spectrum of 100 to 500 Hz. is computed by means of Equation 3 to be approximately 17. This means that there should be 17 passes through the filter, each at a different speed-up factor K in order to cover the entire spectrum.

As it can be seen from an examination of FIG. 2, a larger portion of the spectrum is analyzed by the filter at the low speed-up fatcors than at the high speed-up factors. Thus, a greater number of filter passes will be required at the high speed-up factors (low frequency end of the spectrum) to cover the same portion of spectrum as at the low speed-up factors than at the high speed-up factors. speed-up factor, the amount of time taken for each filter pass is greater at the lower speed-up factors than at the higher speed-up factors. Also, since a greater portion of the spectrum is covered by the filter at low speed-up factors, it follows that resolution is not as high as it is at higher values of K.

In order to take advantage of the best features of each speed-up region, in an alternative embodiment of the invention, the system may be changed by using more than one filter and using each filter only while analyzing the wave over a selected band of speed-up factors K. For example, in the above system for analyzing a 100–500 Hz. data band, two other fixed filters could be used in addition to the single filter 38. The response curves for these two other filters are shown in dashed lines in FIG. 2. All of the filters have a Q of 10, pursuant to specifications of the problem. One of the new filters has a center-frequency of 5 kHz. and a bandwidth of 500 Hz., and the other has a center-frequency of 20 kHz. and a bandwidth of 2 kHz. The 5 kHz. filter can be used for analyzing the lower frequency portion of the data band, the 10 kHz. filter for the central band of frequencies, and the 20 kHz. filter for the high-frequency portion of the data band. By this means, the minimum speed-up factor can be substantially increased and the total analysis time can be minimized.

Although the foregoing discussion assumes that the filter 38 is of the analog type, that is, that it is composed of capacitors, inductors, and resistors, the filter also can be of the conventional digital type in which effective filtering is performed by conventional computer techniques.

Figure 5:
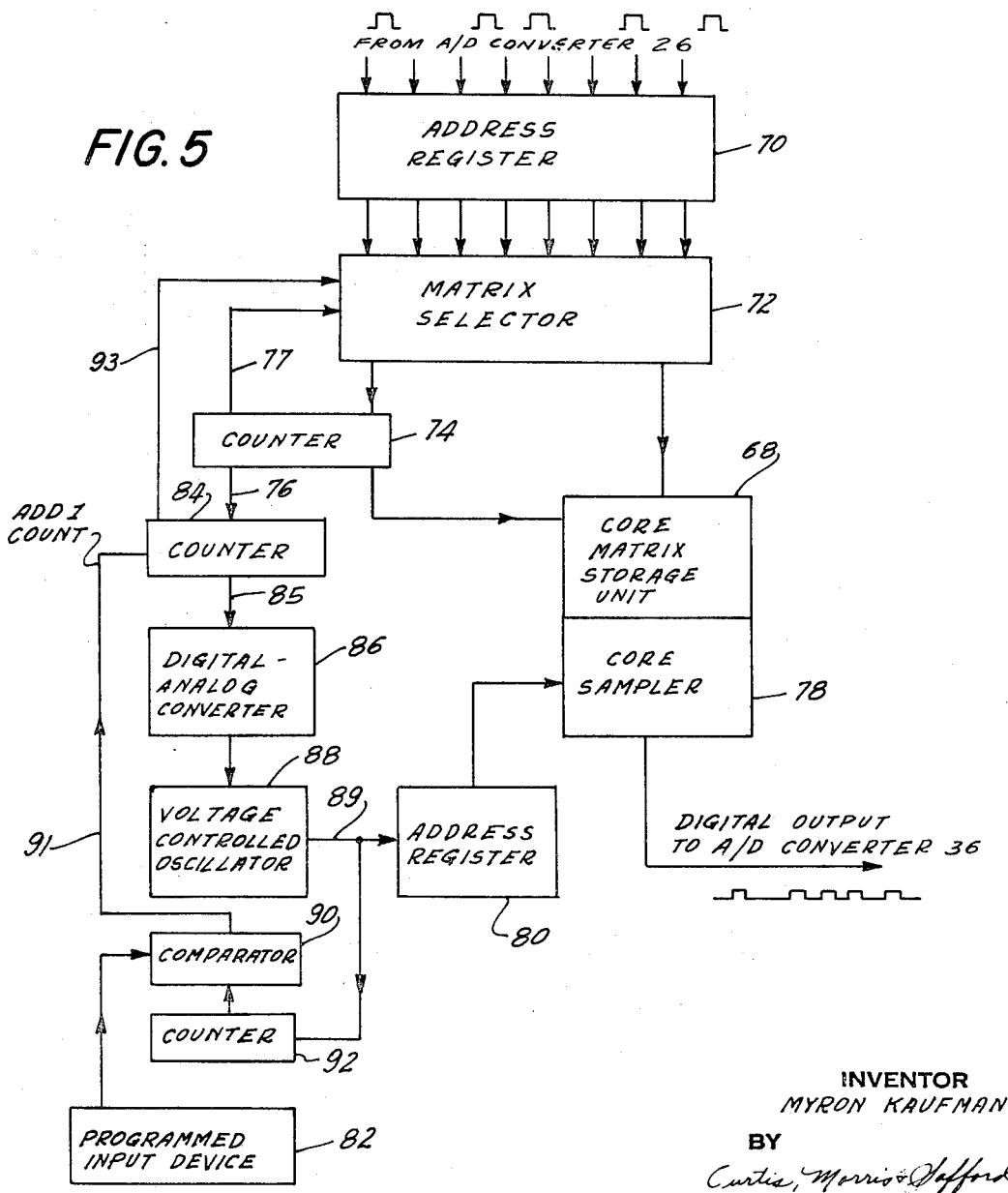
FIG. 5 is a more detailed schematic diagram of a portion of the system shown in FIG. 1.

Referring now to FIG. 5 as well as FIG. 1, the manner in which the multiple passes and speed-up are produced by the storage device 28, read-out device 30 and the clock source 32 now will be described in greater detail. A magnetic core matrix storage unit 68 is used for storing the signal from convertor 26. Each sample of the incoming wave is stored in digital form at a separate address within the martix storage unit 68. A conventional address register 70 and matrix selector ssytem 72 are used to direct each of the succeeding samples to its appropriate address. A counter 74 counts the pulses input to the matrix storage unit 68. When it has counted a pre-set number of pulses indicating that the incoming signal is completely stored in the matrix 68, it sends a signal over line 76 to start the clock pulse source which will actuate a core sampling device 78 to sample each of the addresses in storage unit 68 sequentially in response to a series of clock pulses distributed by an address register 80. Counter 74 also sends a pulse over line 77 to matrix selector 72 to disable the selector and prevent further storage of incoming signals until the recirculation is complete. Each clock pulse will cause the reading-out of the information stored in one address. The system automatically determines when the signals from all of the cores have been read-out and then automatically adjusts the clock pulse source to a different rate pursuant to instructions from a programmed input device 82. Then, read-out is resumed and the read-out cycle is repeated the specified number of times.

The variable clock source comprises a counter 84 which supplies a digital output of a magnitude proportional to the number of pulses it receives. The output of counter 84 is conducted over lead 85 to a digital-to-analog convertor 86 which supplies an output voltage whose magnitude is proportional to the count signal from counter 84. The output from convertor 86 is fed to an oscillator which supplies clock pulses over output lead 89 at a frequency controlled by the voltage from convertor 86. The clock singals are conducted from lead 89 to another counter 92 which sends its count signal to a comparator 90. The programmed input device 82 delivers to comparator 90 a signal indicating the number of clock pulses to be delievred during each circulation of data in the system. When the count signal from conuter 92 reaches the programmed level, the comparator sends a signal over line 91 to counter 84 to increase the count by one digit and increase the frequency of oscillator 88 by one step. This sequence is repeated until the counter 84 senses the required number of recirculations of data, and then sends a turn-off signal to oscillator 89 and an enabling signal to matrix selector 72 over line 93 to enable it to again receive input signals and store them in unit 68.

If the storage device 28 is a magnetic drum or disk, each digital sample signal is stored in a specific spot on the drum or disk while it is rotating. Non-destructive read-out is accomplished by conventional read-out transducers, and the read-out rate can be varied by changing the rotational read-out speed of the drum or disk. The rotational speed of the drum can be controlled by the clock pulse frequency by means of conventional digital techniques, or by similarly conventional analog control techniques. The signal stored on the drum can be recirculated for each filter pass simply by rotating the drum through another revolution.

If magnetic tape is used for storage of the signals, the sample signals can be recorded on an endless magnetic belt of a length approximately equal to the space necessary to store the incoming information. Then, the signal may be reproduced with standard magnetic tape reproducing equipment by moving the tape past transducer heads a number of times at different speeds, thus providing a variable speed-up rate and a suitable number of filter passes.

Many input signals to be analyzed are continuous in nature, and the modification of the FIG. 1 system shown in FIG. 4 can be used to insure that none of the incoming data is lost while the data is being recirculated through the filter. The system shown in FIG. 4 is the same as that shown in FIG. 1 except that an auxiliary storage unit 29 is provided in addition to the unit 28. While data is being read-out of storage unit 28, the incoming signal is stored in storage unit 29. Then, by means of switches 50 and 52 which are controlled by unit 32, the read-out unit 30 is connected to storage unit 29 and the input is again connected to unit 28 to store the incoming signal.

The auxiliary storage unit 29 need not, of course, comprise an entire separate storage unit. For example, it can consist of a separate set of cores in a magnetic core array. Alternatively, it can consist of a second channel on a rotating magnetic drum or disk, or a separate loop of magnetic tape in a tape storage and playback system.

Another alternative embodiment of the invention is shown in FIG. 3. In this embodiment, the signal 10 is applied to an input terminal 54 and is conducted directly to an analog tape recorder 56 for storage. The playback section 58 of the recorder is adapted to vary the playback speed infinitely; that is, in infinitely small increments as opposed to relatively large steps. The playback speed and recirculation control unit 60 is programmed to control the playback speed of the playback device 58. The signal is recorded directly on an endless tape as described above, and the unit 60 controls the speed and the number of recirculations of the tape during playback of the signal. A single filter 62 filters the output of the playback unit 58 and provides a panoramic display 66 in a display device 64 in the manner described above in connection with FIG. 1. The unit 60 which controls the playback speed of the signal also controls the horizontal sweep of the display oscilloscope 64.

In all of the above-described embodiments of the invention, considerable simplification and miniaturization is provided as compared to prior art devices. For example, in the sample problem discussed above, in which a data band of from 100 to 500 c.p.s. is analyzed with a constant Q of 10, it can be shown that 17 separate filters or other complicated apparatus must be provided in order to analyze the hole spectrum. In the present system, however, only one filter is required. Although a small amount of extra equipment is required to vary the speed-up factor of the data, this equipment is more compact than would be a commensurate number of additional filters. The reason for this is that the control circuitry can be miniaturized very greatly by modern techniques, whereas the miniaturization of filter elements has not been nearly as successful. Furthermore, the use of a single filter or only a few filters provides much greater flexibility in the selection of the Q and the form factor of the filter system. For example, if only one filter is required, it would be very inexpensive to change the single filter to one having a different Q value. In a multiple Q filter system having, for example, 10 different Q values, only ten filters would be required, whereas in a system requiring N filters for the analysis of a single band, N times 10 filters would be required. Thus, especially in such systems, vast cost savings will be realized.

The above description of the invention is intended to be illustrative and not limiting. Various changes or modifications in the embodiments described may occur to those skilled in the art and these can be made without departing from the spirit or scope of the invention as set forth in the claims.

I claim:

1. Apparatus for electrical signal spectrum analysis, said apparatus comprising, in combination, storage means for storing an electrical signal to be analyzed, read-out means for reading-out said signal from said storage means, means for varying the speed of said read-out means at speeds faster than the generation rate of said signal, means for repeating the operation of said read-out means to read-out said signal a plurality of times at a plurality of different speeds, and filter means connected to said read-out means for analyzing said signal wherein the filter output signals are indicative of the magnitudes of the spectral components of said electrical signal.

2. Apparatus as in claim 1 in which said speed is infinitely variable and said storage means is an analog recorder such as a magnetic tape recorder.

3. Apparatus as in claim 1 in which said filter means has only one center-frequency and bandwidth.

4. Apparatus as in claim 3 in which said filter means is a single fixed-band filter.

5. Apparatus as in claim 1 including panoramic display means receiving an output from said filter means and receiving a signal which is a function of the read-out speed for said signal.

6. Apparatus as in claim 4 in which said repeating means delivers a timing signal which is a function of said read-out speed to said read-out means, and to said panoramic display means.

7. Apparatus as in claim 6 in which said panoramic display means is an oscilloscope whose Y-coordinate input receives the output of said filter, and whose X-coordinate input receives said timing signal.

8. Apparatus as in claim 1 including means for sampling the signal to be analyzed at spaced time intervals, analog-to-digital conversion means connected for converting the output of said sampling means to digital form, digital-to-analog conversion means connected for converting the sped-up output of said read-out means into analog form and delivering its output to said filter means.

9. Apparatus as in claim 1 including auxiliary storage means for receiving another incoming signal while the first signal is being read out from the first storage means, and means for transferring said other signal to said read-out means when read-out of the first signal is complete.

10. A method of analyzing a selected spectrum of an electrical signal, said method comprising the steps of storing said signal, playing back said signal at a first rate, filtering said sped-up signal at a given filter center-frequency, playing back said signal at a second rate different from said first rate, and filtering the latter sped-up signal at said given filter center frequency wherein the filtered signals are indicative of the magnitudes of the spectral components of said electrical signal.

11. A method as in claim 10 in which said selected spectrum has a lower and an upper frequency, and selecting said filter center-frequency and speed-up rates are so that at one speed-up rate the maximum frequency of the sped-up spectrum is adjacent said center frequency and at the other speed-up rate the minimum frequency of the sped-up spectrum is adjacent said center frequency.

12. A method as in claim 11 including speeding-up said signal at different rates and filtering said signal at said center-frequency a number of different times sufficient to effectively filter the entire spectrum.

13. A method as in claim 10 including the step of speeding-up said signal at a third rate and filtering the latter sped-up signal at a different center-frequency.

14. A method as in claim 13 in which said different center-frequency is adjacent the minimum frequency in said spectrum.

15. A method as in claim 13 in which said different center-frequency is adjacent the maximum frequency in said spectrum.

References Cited

UNITED STATES PATENTS 3,021,478    2/1962    Meacham      324—77(C)

OTHER REFERENCES

Gill, A Versatile Method for Short-Term Spectrum Analysis in Real Time, Nature, pp. 117–119, vol. 189, Jan. 14, 1961.

E. E. KUBASIEWICZ, Primary Examiner